(12) United States Patent
Jankowski

(10) Patent No.: US 8,469,042 B2
(45) Date of Patent: Jun. 25, 2013

(54) TREATMENT SYSTEM AND METHOD FOR THE SURFACE TREATMENT OF WORKPIECES, PARTICULARLY VEHICLE BODIES

(75) Inventor: Ralf Jankowski, Wolfsburg (DE)

(73) Assignee: Volkswagen Aktiengesellschaft, Munich (DE)

( * ) Notice: Subject to any disclaimer, the term of this patent is extended or adjusted under 35 U.S.C. 154(b) by 418 days.

(21) Appl. No.: 12/845,934

(22) Filed: Jul. 29, 2010

(65) Prior Publication Data

US 2011/0011336 A1 Jan. 20, 2011

Related U.S. Application Data

(63) Continuation of application No. PCT/EP2009/000157, filed on Jan. 14, 2009.

(30) Foreign Application Priority Data

Jan. 29, 2008 (DE) .......................... 10 2008 006 466

(51) Int. Cl.
*B08B 3/00* (2006.01)
(52) U.S. Cl.
USPC ............. 134/61; 134/123; 134/133; 134/135; 134/137; 134/166 R; 118/70; 198/339.1
(58) Field of Classification Search
None
See application file for complete search history.

(56) References Cited

U.S. PATENT DOCUMENTS

| 4,812,211 A | 3/1989 | Sakai |
| 5,110,440 A | 5/1992 | Case |
| 6,345,635 B2 | 2/2002 | Lachmann et al. |
| 6,419,983 B1 | 7/2002 | Kreuzer |
| 2010/0006440 A1 | 1/2010 | Baldassari |

FOREIGN PATENT DOCUMENTS

| DE | 1159349 B | 12/1963 |
| DE | 19641048 A | 4/1998 |
| DE | 19950892 A1 | 5/2001 |
| DE | 10217634 A1 | 11/2003 |
| EP | 1050495 A2 | 11/2000 |
| WO | 02072284 A2 | 9/2002 |
| WO | 2006039000 A1 | 4/2006 |
| WO | 2008096235 A1 | 8/2008 |

OTHER PUBLICATIONS

International Search Report dated Apr. 23, 2009.
German Search Report dated Dec. 5, 2008.

*Primary Examiner* — Eric Golightly
(74) *Attorney, Agent, or Firm* — Laurence A. Greenberg; Werner H. Stemer; Ralph E. Locher

(57) ABSTRACT

A treatment system for the surface treatment of workpieces, particularly vehicle bodies, includes a plurality of transport devices, on which at least one workpiece to be treated can be attached in a releasable manner. A conveying device moves the transport devices through the treatment system. At least one treatment bath is disposed in a first conveying plane of the treatment system and the transport devices with the workpieces arranged thereon are introduced into the treatment bath. At least one cleaning device, which is suitable and designed for cleaning the transport devices after the surface treatment of the workpieces, is disposed in a second conveying plane of the treatment system. The second conveying plane is offset in the vertical direction relative to the first conveying plane.

11 Claims, 1 Drawing Sheet

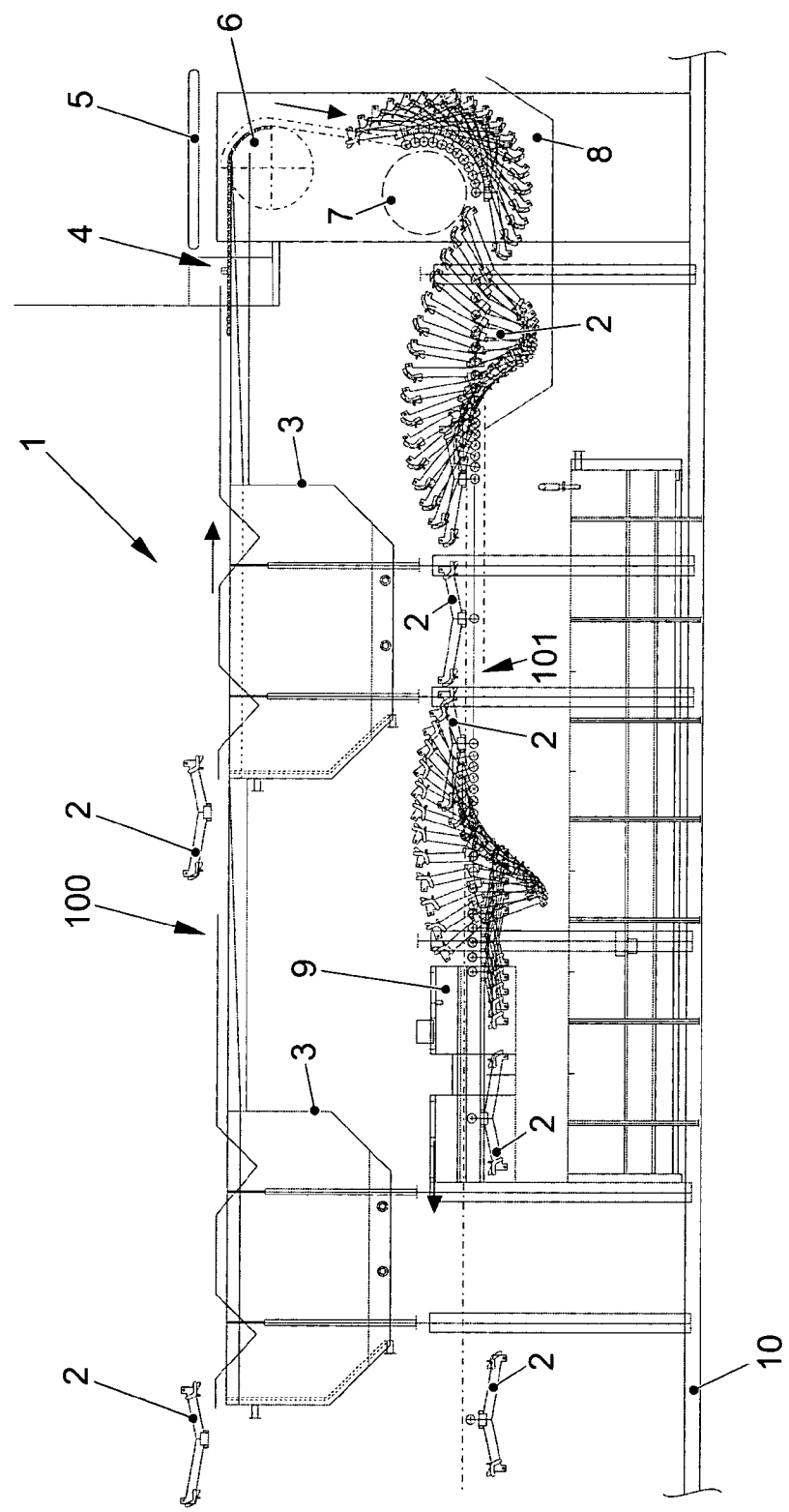

TREATMENT SYSTEM AND METHOD FOR THE SURFACE TREATMENT OF WORKPIECES, PARTICULARLY VEHICLE BODIES

CROSS-REFERENCE TO RELATED APPLICATION

This application is a continuation, under 35 U.S.C. §120, of copending international application No. PCT/EP2009/000157, filed Jan. 14, 2009, which designated the United States; this application also claims the priority, under 35 U.S.C. §119, of German patent application No. DE 10 2008 006 466.1, filed Jan. 29, 2008; the prior applications are herewith incorporated by reference in their entirety.

BACKGROUND OF THE INVENTION

Field of the Invention

The present invention relates to a treatment system for the surface treatment of workpieces, particularly vehicle bodies, comprising a plurality of transport devices, on each of which at least one workpiece to be treated can be releasably mounted, a conveying device by means of which the transport devices can be conveyed through the treatment system, at least one treatment bath which is arranged in a first conveying plane of the treatment system and into which the transport devices with the workpieces arranged thereon can be fed, and at least one cleaning apparatus which is suitable and is designed for cleaning the transport devices after the surface treatment of the workpieces. The present invention furthermore relates to a method for the surface treatment of workpieces, particularly vehicle bodies.

Various embodiments of treatment systems for the surface treatment of workpieces, particularly vehicle bodies, by means of which the surfaces of the workpieces can be, for example, coated or treated in some other way are already known from the prior art.

For example, U.S. Pat. No. 6,419,983 B1 and its counterpart German published patent application DE 196 41 048 A1 disclose a treatment system for the surface treatment of workpieces, particularly vehicle bodies, which has a plurality of treatment baths which are arranged one behind another in the conveying direction and into which the workpieces (for example vehicle bodies) which are to be treated and are arranged releasably on transport devices can be fed. In this case, the workpieces which are to be treated are immersed in a rotational dip process in the respective treatment bath by superimposition of a translational and a rotational movement at the beginning of a treatment bath and are conveyed out of the treatment bath again at the end of the treatment bath by superimposition of a translational and a rotational movement. In this case, the transport devices (rotary bogies) permit a rotational movement about the dedicated axis. After the surface treatment of the workpieces, the transport devices have to be cleaned manually in a relatively costly process.

Approaches are already known from the prior art for automating and thereby simplifying the cleaning of the transport devices after the surface treatment of the workpieces. A treatment system of the type mentioned at the beginning is known from U.S. Pat. No. 5,110,440. In that treatment system, by means of which vehicle bodies can be subjected to a cathodic dip coating process, a loading station is provided in which a vehicle body which is not yet coated can be placed onto a transport device (rotary bogie). The transport device is moved by means of a conveying device along the dip coating line, which has a plurality of process zones each having a treatment bath, and is coated in a "rotational dip process" (RoDip process). The treatment system has a drying station in which the painted vehicle body is dried and then transferred into finishing stations which are arranged parallel to the dip coating line. Two further process stations are mounted downstream of the drying station, and the unloaded transport devices are first of all cleaned in said process stations in a cleaning bath by means of a rotational dip process and are subsequently rinsed in a rinsing bath mounted downstream. The transport devices cleaned in this manner after the end of the dip coating process are conveyed back to the loading station in a return path extending above the dip coating line and can be reloaded in said loading station with an uncoated vehicle body. One disadvantage of the solution known from the abovementioned publication is that it takes up a relatively large amount of space.

This is where the present invention fits in.

SUMMARY OF THE INVENTION

It is accordingly an object of the invention to provide a treatment system and method for the surface treatment of articles which overcome the above-mentioned disadvantages of the heretofore-known devices and methods of this general type and which provides for a treatment system that is designed more compactly than the solutions known from the prior art and permits efficient cleaning of the transport devices. Furthermore, the present invention is based on the object of providing a method for the surface treatment of articles of manufacture, particularly vehicle bodies, in which the cleaning of the transport devices after the surface treatment can be simplified in comparison to the prior art.

With the foregoing and other objects in view there is provided, in accordance with the invention, a treatment system for the surface treatment of workpieces, in particular for the surface treatment of vehicle bodies. The system comprises:

a plurality of transport devices configured for releasably mounting thereon at least one workpiece to be treated;

a conveying device for conveying the transport devices through the treatment system;

at least one treatment bath arranged in a first conveying plane of the treatment system and configured to receive therein said transport devices with respective workpieces mounted thereon;

at least one cleaning apparatus for cleaning said transport devices after the surface treatment of the workpieces, said at least one cleaning apparatus being disposed in a second conveying plane offset in a vertical direction relative to said first conveying plane.

In other words, the objects of the invention are achieved with a treatment system for the treatment of articles, particularly vehicle bodies, that includes at least one cleaning apparatus in a second conveying plane of the treatment system, which conveying plane is offset in the vertical direction with respect to the first conveying plane. The effect which can be achieved by this measure is that the cleaning apparatus can be arranged in a relatively space-saving manner in the second conveying plane and therefore in the return path of the treatment system. As a result, it is possible in an advantageous manner to design the entire treatment system to be overall more compact than the solutions known from the prior art, in particular from U.S. Pat. No. 5,110,440. A further advantage of the solution proposed here is that the surface treatment of the workpieces is carried out in a different conveying plane of the treatment system from the cleaning process of the transport devices.

In a particularly advantageous embodiment, it is proposed that the second conveying plane is arranged below the first conveying plane. In other words, in this embodiment, the first conveying plane, in which the surfaces of the workpieces are treated in the treatment baths, is therefore arranged above the second conveying plane, in which the empty transport devices are cleaned. In an alternative embodiment, it can also be provided that the second conveying plane is arranged above the first conveying plane. In this embodiment, the first conveying plane, in which the workpieces are treated, is therefore arranged below the second conveying plane, in which the empty transport devices are cleaned.

In a preferred embodiment, it is proposed that the cleaning apparatus comprises at least one cleaning bath into which the transport devices can be fed. The empty transport devices can be fed successively with the aid of the conveying device into the at least one cleaning bath in order to free the transport devices from residues of the process liquids with which they have been acted upon in the treatment baths. For this purpose, the transport devices can reside for a certain preset or presettable residence period in the cleaning bath. It can also be provided that the treatment system has a number of cleaning baths which are arranged one behind another in the conveying direction in the return path of the treatment system. In order further to improve the cleaning action of the cleaning apparatus, a particularly advantageous embodiment provides that the cleaning apparatus comprises at least one rinsing device within which the transport devices can be acted upon with a rinsing fluid. The rinsing device is preferably arranged behind the at least one cleaning bath in the conveying direction. For example, in an advantageous embodiment, it can be provided that the rinsing device comprises a spray-type rinsing trough by means of which the transport devices can be cleaned in a combined spraying and rinsing process.

In a particularly preferred embodiment, it is proposed that the transport devices and the conveying device are designed in such a manner that the transport devices with the workpieces arranged thereon can be immersed in the treatment bath by superimposition of a translational and a rotational movement at the beginning of each treatment bath and can be conveyed out of the respective treatment bath again at the end of the treatment bath by superimposition of a translational and a rotational movement. The effect which can be achieved by a rotational dip process of this type is efficient treatment of the surfaces of the workpieces in each process stage. The transport devices can preferably be designed as rotary bogies which permit rotation about the dedicated axis thereof.

In a particularly preferred embodiment, it is provided that the transport devices and the conveying device are designed in such a manner that the transport devices can be immersed in the cleaning bath by superimposition of a translational and a rotational movement at the beginning of the at least one cleaning bath and can be conveyed out of the cleaning bath again at the end of the cleaning bath by superimposition of a translational and a rotational movement. The effect which can be achieved by a rotational dip process of this type is efficient cleaning of the transport devices. The transport devices can be immersed in the cleaning bath, in which they are then acted upon with a cleaning fluid, directly after a deflection of the conveying movement of said transport devices from the first conveying plane into the second conveying plane, which deflection takes place with the aid of deflecting means which can be designed in particular as deflecting pulleys.

There is the possibility, in a further advantageous embodiment, for the transport devices and the conveying device to be designed in such a manner that the transport devices are conveyed into the rinsing device by superimposition of a translational and a rotational movement.

It will be understood that the term "workpiece" as used herein may be understood as synonymous with "item," or "article of manufacture," or "article," or "intermediate product."

With the above and other objects in view there is also provide, in accordance with the invention, a method for the surface treatment of workpieces, particularly vehicle bodies, in a treatment system with a plurality of transport devices which are conveyed continuously through the treatment system. The method comprises the following steps:

at the beginning of a first conveying plane at least one workpiece to be treated is arranged releasably on each of the transport devices, the transport device together with the workpiece arranged thereon is conveyed in the first conveying plane and is fed into at least one treatment bath for the surface treatment of the workpiece, the workpiece is removed by the transport device after the surface treatment, the transport device is conveyed into a second conveying plane offset vertically with respect to the first conveying plane and is cleaned in at least one cleaning apparatus, then the transport device is conveyed to the beginning of the first conveying plane.

In accordance with an added feature of the invention, the transport device with the workpiece mounted thereon is successively fed into a plurality of treatment baths.

In accordance with an additional feature of the invention, the transport device with the workpiece mounted thereon is immersed in the treatment bath by superposition of a translational movement and a rotational movement at a beginning of each treatment bath and the transport device and the workpiece are conveyed out of the respective treatment bath at an end of the treatment bath by superposition of a translational movement and a rotational movement.

Similarly, the transport device (without the workpiece) is immersed in a cleaning bath of the cleaning apparatus by superposition of a translational movement and a rotational movement at a beginning of the cleaning bath and then the transport device is moved out of the cleaning bath at an end of the cleaning bath by superposition of a translational movement and a rotational movement.

In accordance with a concomitant feature of the invention, the transport device is rinsed in a rinsing device of the cleaning apparatus.

Other features which are considered as characteristic for the invention are set forth in the appended claims.

Although the invention is illustrated and described herein as embodied in a treatment system and method for the surface treatment of workpieces, particularly vehicle bodies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of a specific embodiment when read in connection with the accompanying drawing.

BRIEF DESCRIPTION OF THE DRAWING

The FIGURE of the drawing is a side view of a part of a treatment system for treating workpieces, particularly vehicle bodies.

DETAILED DESCRIPTION OF THE INTENTION

Referring now to the sole FIGURE of the drawing in detail, there is shown a treatment system 1 which has a support structure 10 which defines two conveying planes 100, 101. A first conveying plane 100 and a second conveying plane 101 extend substantially parallel to each other. The second conveying plane 101 runs below the first conveying plane 100 and therefore is arranged offset in the vertical direction with respect to the first conveying plane 100. A plurality of treatment baths 3 which are arranged one behind another in the conveying direction, which is indicated in the FIGURE by an arrow (from left to right at the top of the FIGURE), are provided in the first conveying plane 100. The treatment baths 3 within which the surfaces of the workpieces, which may be in particular vehicle bodies, can be treated are each filled with a process liquid. In the exemplary embodiment shown here, the treatment system 1 for the treatment of workpieces is suitable for the cathodic dip coating of the workpieces. A cathodic dip coating method is an electrochemical method in which the workpieces that are to be coated are coated in a treatment bath 3 or—as in the exemplary embodiment shown here—in a plurality of treatment baths 3. Since cathodic dip coating methods are already well known from the prior art, the particular characteristics of methods of this type will not be explained in more detail at this juncture.

The treatment system 1 comprises a plurality of transport devices 2 on each of which at least one of the workpieces to be treated in the treatment system 1, particularly a vehicle body, can be arranged releasably. For this purpose, the treatment system 1 preferably has a loading station at the beginning of the first conveying plane 100, in which loading station the workpieces can be loaded onto the corresponding transport devices 2. The transport devices 2 are conveyed with the aid of a conveying device (not provided with reference numbers), which interacts with the transport devices 2, along the first conveying plane 100 and the second conveying plane 101 in the conveying direction of the treatment system 1 in a continuously circulating process.

In this case, the transport devices 2 and the conveying device are designed in such a manner that, in a rotational dip process, the transport devices 2 with the workpieces arranged thereon can be immersed in the treatment bath 3 in the first conveying plane 100 by superimposition of a translational and a rotational movement at the beginning of each treatment bath 3 and can be conveyed out of the respective treatment bath 3 again at the end of the treatment bath 3 by renewed superimposition of a translational and a rotational movement. A rotation dip process of this type permits a particularly thorough and efficient dip coating or treatment of the surfaces of the workpieces. The transport devices 2 are preferably designed as rotary bogies which permit rotation about the dedicated axis thereof.

At the end of the first conveying plane 100, the treatment system 1 has an unlocking apparatus 4 by means of which the releasable connection of the workpieces to the respective transport device 2 can be unlocked preferably automatically. The unlocking apparatus 4 is adjoined in the conveying direction by a discharging apparatus 5 by means of which the workpieces can be removed from the respective transport device 2 after the surface treatment (coating) and can be guided out of the treatment system 1. The coated workpieces can be subsequently supplied, for example, to a drying station in which they can be dried. Furthermore, further finishing stations, in which the surfaces of the articles can be finished, can also be provided.

So that the empty transport devices 2 can be cleaned after the surface treatment of the workpieces and can thereby be freed from residues of the process liquids with which the workpieces were acted upon during the treatment in the treatment baths 3, transport devices 2 are deflected via a first deflecting means 6 and via a second deflecting means 7 into the second conveying plane 101 extending below the first conveying plane 100, and supplied there to a cleaning apparatus. In this exemplary embodiment, the two deflecting means 6, 7 are designed as deflecting pulleys.

In this exemplary embodiment, the cleaning apparatus comprises a cleaning bath 8 which is arranged at the beginning of the second conveying plane 101 and is filled with a cleaning fluid, and a rinsing device 9 which is arranged behind the cleaning bath 8 in the conveying direction. Instead of an individual cleaning bath 8 and an individual rinsing device 9, a plurality of cleaning baths 8 and/or rinsing devices 9 arranged behind one another in the second conveying plane 101 may also be provided.

In this exemplary embodiment, after being deflected by means of the deflecting means 6, 7, the transport devices 2 are immediately immersed in the cleaning bath 8 by superposition of a translational and a rotational movement at the beginning of the cleaning bath 8 and are conveyed out of the cleaning bath 8 again at the end of the cleaning bath 8 by superimposition of a translational and a rotational movement. In other words, after being deflected, the transport devices 2 are therefore immersed directly in the cleaning bath 8 and are cleaned therein with the aid of the cleaning fluid.

After a certain preset or presettable residence period in the cleaning bath 8 (for example approximately 60 seconds), the transport devices 2 are moved out of the cleaning bath 8 by means of a combined translational and rotational movement and are subsequently supplied to the rinsing device 9 in which they are rinsed with a rinsing fluid. In this exemplary embodiment, the rinsing device 9 comprises a spray-type rinsing trough in which the transport devices 2 are sprayed clean. It can be seen that the transport devices 2 are again conveyed into the rinsing device 9 by superimposition of a translational and a rotational movement. After the rinsing process in the rinsing device 9, the transport devices 2 are continuously moved on in the conveying direction in the second conveying plane 101 in a pure translational movement and are moved again out of the second conveying plane 101 into the first conveying plane 100 of the treatment system 1 by deflecting means (likewise not illustrated explicitly here) which may also be designed, for example, as deflecting pulleys. In the loading station at the beginning of the first conveying plane 100, workpieces which are to be treated can then again be placed onto the empty transport devices 2 and, as explained in detail above, treated in the treatment baths 3 of the treatment system 1.

The invention claimed is:

1. A treatment system for the surface treatment of workpieces, the system comprising:
   a plurality of transport devices configured for releasably mounting thereon at least one workpiece to be treated;
   a conveying device for conveying the transport devices through the treatment system;
   at least one treatment bath arranged in a first conveying plane of the treatment system and configured to receive therein said transport devices with respective workpieces mounted thereon; and at least one cleaning apparatus for cleaning said transport devices after the surface treatment of the workpieces, said at least one cleaning apparatus being disposed in a second conveying plane offset in a vertical direction relative to said first conveying plane.

2. The treatment system according to claim 1, wherein said transport devices are configured to support workpieces being vehicle bodies.

3. The treatment system according to claim 1, wherein said second conveying plane is disposed below said first conveying plane.

4. The treatment system according to claim 1, wherein said second conveying plane is disposed above said first conveying plane.

5. The treatment system according to claim 1, wherein said cleaning apparatus comprises at least one cleaning bath configured to receive therein said transport devices.

6. The treatment system according to claim 1, wherein said cleaning apparatus comprises at least one rinsing device configured to subject said transport devices to a rinsing fluid therein.

7. The treatment system according to claim 6, wherein said rinsing device is arranged behind said at least one cleaning bath in a conveying direction.

8. The treatment system according to claim 6, wherein said rinsing device is a spray-type rinsing trough.

9. The treatment system according to claim 1, wherein said transport devices and said conveying device are configured to enable said transport devices with the workpieces releasably mounted thereon to be immersed in the treatment bath by superposition of a translational movement and a rotational movement at a beginning of each treatment bath, and to be conveyed out of the respective treatment bath at an end of the treatment bath by superposition of a translational movement and a rotational movement.

10. The treatment system according to claim 5, wherein said transport devices and said conveying device are configured to enable said transport devices to be immersed in the cleaning bath by superposition of a translational movement and a rotational movement at a beginning of the at least one cleaning bath and to be conveyed out of the cleaning bath at an end of the cleaning bath by superposition of a translational movement and a rotational movement.

11. The treatment system according to claim 6, wherein said transport devices and said conveying device are configured to enable said transport devices to be conveyed into said rinsing device by superposition of a translational movement and a rotational movement.

\* \* \* \* \*

UNITED STATES PATENT AND TRADEMARK OFFICE
CERTIFICATE OF CORRECTION

| | | |
|---|---|---|
| PATENT NO. | : 8,469,042 B2 | Page 1 of 1 |
| APPLICATION NO. | : 12/845934 | |
| DATED | : June 25, 2013 | |
| INVENTOR(S) | : Ralf Jankowski | |

It is certified that error appears in the above-identified patent and that said Letters Patent is hereby corrected as shown below:

On the Title Page:

Item [73] should read as follows:

Volkswagen Aktiengesellschaft, Wolfsburg (DE)

Signed and Sealed this
Seventeenth Day of September, 2013

Teresa Stanek Rea
*Deputy Director of the United States Patent and Trademark Office*